(12) United States Patent
Liang et al.

(10) Patent No.: US 10,216,712 B2
(45) Date of Patent: Feb. 26, 2019

(54) WEB PAGE DISPLAY METHOD AND DEVICE

(71) Applicant: UC MOBILE LIMITED, Beijing (CN)

(72) Inventors: Jie Liang, Beijing (CN); Yongfu Yu, Beijing (CN); Xiaopeng He, Beijing (CN); Shunyan Zhu, Beijing (CN); Xiaozhen Wang, Beijing (CN); Jinhe Zeng, Beijing (CN)

(73) Assignee: UC Mobile Limited, Beijing (CN)

( * ) Notice: Subject to any disclaimer, the term of this patent is extended or adjusted under 35 U.S.C. 154(b) by 326 days.

(21) Appl. No.: 14/770,385

(22) PCT Filed: Sep. 5, 2013

(86) PCT No.: PCT/CN2013/083008
§ 371 (c)(1),
(2) Date: Aug. 25, 2015

(87) PCT Pub. No.: WO2014/131276
PCT Pub. Date: Sep. 4, 2014

(65) Prior Publication Data
US 2016/0012025 A1    Jan. 14, 2016

(30) Foreign Application Priority Data
Feb. 27, 2013    (CN) .......................... 2013 1 0061239

(51) Int. Cl.
*G06F 17/22*    (2006.01)
*G06F 3/0484*    (2013.01)
(Continued)

(52) U.S. Cl.
CPC ........ *G06F 17/2247* (2013.01); *G06F 3/0484* (2013.01); *G06F 17/211* (2013.01);
(Continued)

(58) Field of Classification Search
CPC .................................................. G06F 17/2247
See application file for complete search history.

(56) References Cited

U.S. PATENT DOCUMENTS

2007/0293283 A1*  12/2007  Inubushi ............. H04M 1/0237
                                                        455/575.1
2009/0298550 A1*  12/2009  Kang ..................... G06F 3/147
                                                        455/566
(Continued)

FOREIGN PATENT DOCUMENTS

CN    101369210 A    2/2009
CN    102346646 A    2/2012
(Continued)

OTHER PUBLICATIONS

PCT International Search Report dated Dec. 19, 2013, issued in corresponding International Application No. PCT/CN2013/083008 (13 pages).
(Continued)

*Primary Examiner* — James J Debrow
(74) *Attorney, Agent, or Firm* — Sheppard Mullin Richter & Hampton LLP

(57) ABSTRACT

Disclosed are a web page display method and device. The method comprises: determining a reference region in a display region of a first web page, the first web page being a web page displayed in a first display state of a display screen, wherein the area of the reference region is less than or equal to a preset threshold; determining a web page element located in the reference region in the first web page; according to coordinates of the web page element in the first web page and in a second web page, calculating a moving displacement of the web page element in the second web page, wherein the coordinates of the web page element in the second web page are coordinates of the web page element, obtained after the display screen is switched to a second display state from the first display state, in the second web page displayed in the second display state; according to the moving displacement of the web page element in the second web page, moving web page elements in the second web page; and displaying the second web page after the web page
(Continued)

elements are moved. The present invention achieves that when the screen display state changes, web page information before the change is more accurately displayed, and therefore improves the reading experience of users.

18 Claims, 4 Drawing Sheets

(51) Int. Cl.
*G06F 17/21* (2006.01)
*G06F 17/30* (2006.01)
(52) U.S. Cl.
CPC ........ *G06F 17/212* (2013.01); *G06F 17/2211* (2013.01); *G06F 17/30905* (2013.01)

(56) References Cited

U.S. PATENT DOCUMENTS

2010/0174421 A1* 7/2010 Tsai et al. ................ G06F 3/048
2012/0113095 A1* 5/2012 Hwang ............... G06F 3/04817
345/419

FOREIGN PATENT DOCUMENTS

CN 102760027 A 10/2012
CN 103150361 A 6/2013

OTHER PUBLICATIONS

International Written Opinion for PCT/CN2013/083008, dated Dec. 19, 2013, 5 pages.
International Preliminary Report on Patentability for PCT/CN2013/083008, dated Sep. 1, 2015, 6 pages.
First Notice issued by China State Intellectual Property Office, dated Jun. 19, 2015 for Chinese Patent Application No. 201310061239.5 with search report.
Second Notice issued by China State Intellectual Property Office, dated Feb. 26, 2016 for Chinese Patent Application No. 201310061239.5.
Notification to Grant Patent Right for Invention issued by China State Intellectual Property Office, dated Sep. 12, 2016 for Chinese Patent Application No. 201310061239.5.

* cited by examiner

WEB PAGE DISPLAY METHOD AND DEVICE

CROSS-REFERENCE TO RELATED APPLICATION

The present application is a national stage application of International Application No. PCT/CN2013/083008, filed on Sep. 5, 2013, which claims the benefit of Chinese Patent Application No. 201310061239.5, filed on Feb. 27, 2013. The contents of both of the above-referenced applications are herein incorporated by reference in their entirety.

TECHNICAL FIELD

The present invention relates to the field of mobile Internet technology, in particular, to a web page display method and device.

BACKGROUND

Users, when reading by means of a portable device, such as a mobile phone, a tablet, etc., often change the display state of a screen by turning the display screen according to the width of the web page being read to see more information, for example, switching from portrait display to landscape display to obtain more horizontal information on the web page, or switching from landscape display to portrait display, to obtain more vertical information on the web page. Such a reading manner of turning the display screen is very frequently used by users when browsing a web page created for display on computer screens.

During changing the display state of the screen by turning the display screen, because the layout of the entire web page has greatly changed with the change of the screen display state, how to locate the reading region of users prior to turning after the display state of the screen is changed by turning, and to display the reading region in the screen display state after turning has become a key technology.

Available methods include first determining a point before turning the display screen, using a node in which the point is located to determine a certain node in the web page, recording a first position of the node in the web page; finding out a second position of the node in the web page having a new layout after the display state of the screen is changed by turning the display screen; calculating a displacement distance between the first position and the second position, and then moving, in accordance with the displacement distance, the nodes in the entire web page for displaying.

However, in the above web page display methods, because locating the reading region of users by using a certain node has a low locating accuracy, the web page information displayed in the screen display state after turning the display screen often deviates from the web page information read by users prior to the turning, thereby having a serious impact on the reading experience of users.

SUMMARY

Embodiments of the present invention provide a web page display method and device, that, when the screen display state changes, more accurately display web page information prior to the change and improve the reading experience of users.

In order to solve the above technical problem, the embodiments of the present invention disclose the following technical solutions.

According to one aspect of the present invention, a web page display method is provided, which includes:

determining a reference region in a display region of a first web page, the first web page being a web page displayed in a first display state of a display screen, wherein the area of the reference region is less than or equal to a preset threshold;

determining a web page element located in the reference region in the first web page;

according to coordinates of the web page element in the first web page and in a second web page calculating a moving displacement of the web page element in the second web page, wherein the coordinates of the web page element in the second web page are coordinates of the web page element displayed in the second web page in a second display state, obtained after the display screen is switched to the second display state from the first display state ;

according to the moving displacement of the web page element in the second web page, moving web page elements in the second web page, for example, as a whole; and displaying the second web page after the web page elements are moved.

In another aspect, the statement of determining a reference region in a display region of a first web page is:

determining the reference region in an upper left corner of the display region of the first web page.

In another aspect, the reference region is in a rectangular shape.

In another aspect, when a plurality of web page elements are located in the reference region in the first web page, before calculating the moving displacement of the web page element in the second web page according to the coordinates of the web page element in the first web page and in a second web page, the method further includes:

selecting, from the plurality of web page elements, a first web page element that meets a screening condition.

In another aspect, the statement of according to the coordinates of the web page element in the first web page and in a second web page calculating moving displacement of the web page element in the second web page is:

according to the coordinates of the first web page element in the first web page and in the second web page calculating the moving displacement of the first web page element in the second web page.

In another aspect, the statement of selecting, from the plurality of web page elements, a first web page element that meets a screening condition includes:

selecting, from the plurality of web page elements, a web page element having a minimum width and/or a maximum overlapping area with the reference region as the first web page element.

In another aspect, the statement of selecting, from the plurality of web page elements, a first web page element that meets a screening condition includes:

selecting, from the plurality of web page elements, a web page element having at least one corner located in the reference region as the first web page element.

According to another aspect of the present invention, a web page display device is further provided, which comprises:

a region determining unit, configured to determine a reference region in a display region of a first web page, the first web page being a web page displayed in a first display state of a display screen, wherein the area of the reference region is less than or equal to a preset threshold;

an element determining unit, configured to determine a web page element located in the reference region in the first web page;

a displacement calculating unit, configured to, according to coordinates of the web page element in the first web page and in a second web page, calculate a moving displacement of the web page element in the second web page, wherein the coordinates of the web page element in the second web page are coordinates of the web page element displayed in the second web page in a second display state, obtained after the display screen is switched to the second display state from the first display state;

a web page moving unit, configured to, according to the moving displacement of the web page element in the second web page, move web page elements in the second web page; and a display unit, configured to display the second web page after the web page elements are moved.

In another aspect, the region determining unit is configured to determine the reference region in an upper left corner of the display region of the first web page.

In another aspect, the reference region is in a rectangular shape.

In another aspect, the device further comprises:

a screening unit, configured to, when a plurality of web page elements are located in the reference region in the first web page, before the displacement calculating unit calculates the moving displacement of the web page element in the second web page, select, from the plurality of web page elements, a first web page element that meets a screening condition; and the displacement calculating unit, configured to, according to the coordinates of the first web page element in the first web page and in the second web page, calculate the moving displacement of the first web page element in the second web page.

In another aspect, the screening unit is configured to select, from the plurality of web page elements, a web page element having a minimum width and/or a maximum overlapping area with the reference region as the first web page element.

In another aspect, the screening unit is configured to select, from the plurality of web page elements, a web page element having at least one corner located in the reference region as the first web page element.

According to yet another aspect of the present invention, a computer-readable medium having processor-executable program codes is also provided. The processor-executable program codes when executed, cause a processor to perform the following steps:

determining a reference region in a display region of a first web page, the first web page being a web page displayed in a first display state of a display screen, wherein the area of the reference region is less than or equal to a preset threshold;

determining a web page element located in the reference region in the first web page;

according to coordinates of the web page element in the first web page and in a second web page, calculating a moving displacement of the web page element in the second web page, wherein coordinates of the web page element in the second web page are coordinates of the web page element displayed in the second web page in a second display state, obtained after the display screen is switched to the second display state from the first display state;

according to the moving displacement of the web page element in the second web page, moving web page elements in the second web page; and displaying the second web page after the web page elements are moved.

In the embodiments of the present invention, the reference region is set to limit the web page element for locating the reading region of users, thereby reducing the area of the region occupied by the selected web page element, and increasing the rationality of the selected web page element, and the web page element is selected to enhance the accuracy of locating the reading region of users, further to enhance the accuracy of the moving displacement of the web page element when calculating the moving displacement of the web page element according to the position moving of the web page element, and when the screen display state changes, to achieve more accurate display of the web page information prior to the change and to reduce the possibility of the situation occurring in the art that the web page information displayed after the turning of the display screen deviates from the web page information read by users before the turning due to inaccurate locating of the reading region of users, thereby improving the reading experience of users.

BRIEF DESCRIPTION OF THE DRAWINGS

To describe the technical solutions in the embodiments of the present invention or in the available technologies more clearly, the following briefly introduces the accompanying drawings required for describing the embodiments or the available technologies . Apparently, one of ordinary skill in the art may still derive other drawings from these accompanying drawings without any creative efforts.

DETAILED DESCRIPTION OF THE EMBODIMENTS

The web page element or elements mentioned in the following refers to a basic element or elements for constituting a web page, which may include visible elements such as text, images, audio, animation, video, rectangular panes with a background color or a background pattern, and also may include rectangular panes having no real display content but a size used for location.

In the available methods for web page display , because locating the reading region of users directly by using a random node in the web page has a low locating accuracy, and has even a lower accuracy especially when a selected point misses a small node nearby but falls within a node that occupies a larger area in the web page, the web page information displayed in the changed screen display state after turning the display screen often deviates from the web page information read by users prior to the turning, thereby having a serious impact on the reading experience of users. On such basis, the embodiments of the present invention set a reference region to surround a web page element (i.e. a node in the available technologies) for reference in a web page, to increase the rationality of web page elements available to be selected and the finally selected web page element. The web page element is selected to enhance the accuracy of locating the reading region of users, and to reduce the possibility of the situation occurring in the available technologies that the web page information displayed after the turning of the display screen deviates from the web page information read by users prior to the turning due to inaccurate locating of the reading region of users, thereby improving the reading experience of users.

To help those skilled in the art better understand the technical solution in the embodiments of the present invention, and make the above objectives, features, and advantages of the embodiments of the present invention more apparent and comprehensible, the technical solution in the embodiments of the present invention is further illustrated hereinafter in detail in combination with the accompanying drawings.

Figure 1:
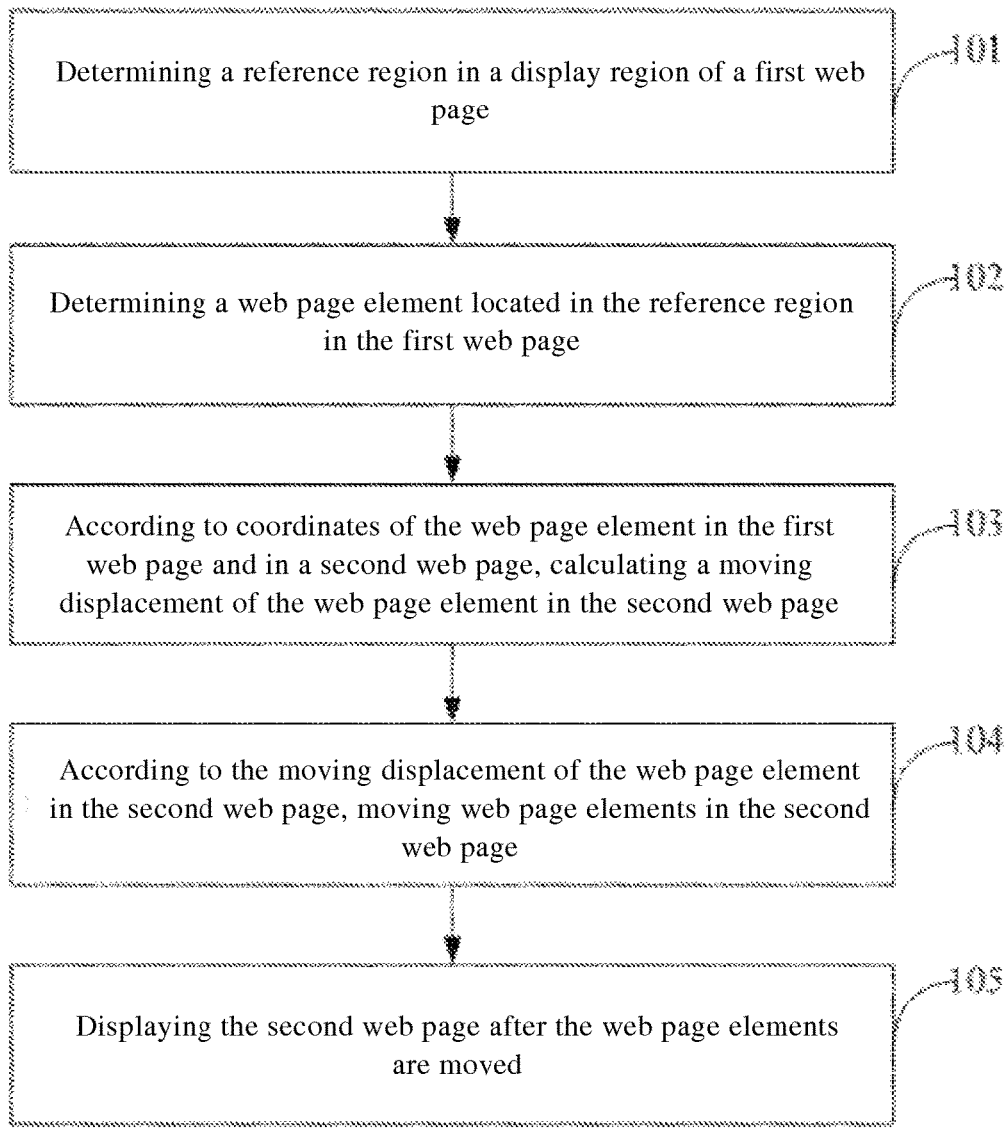
FIG. 1 is a flowchart of a web page display method according to an exemplary embodiment of the present invention.

FIG. 1 is a flowchart of the web page display method according to an embodiment of the present invention.

The method may include:

Step 101: determining a reference region in a display region of a first web page.

In different display states, such as a landscape or portrait display state, the same web page may have different layouts. In the embodiments of the present invention, the first web page and the second web page respectively represent pages with different layouts displayed for the same web page in different display states, the first web page being a web page displayed in a first display state of a display screen, and the second web page being the above web page displayed in a second display state of the display screen. In the embodiments of the present invention, the first display state of the display screen may refer to any one of landscape and portrait display states, and the second display state of the display screen is the other one of the landscape and portrait display states.

In this step, the reference region is determined in a display region of the first web page. For example, the reference region may be located in the upper left corner of the display region, which also corresponds to the upper left corner of the display screen, and certainly may also, but is not limited to, be located in the middle position or the upper right corner of the display region. For example, the reference region may be in any shapes, and preferably, but is not limited to, in a rectangular shape. Reference can be made to the preferred embodiment of this embodiment hereinafter for details.

In order to avoid the inaccurate locating of the reading region of users caused by an overly large area of the region occupied by the subsequently selected web page elements, the area of the reference region for framing and selecting the web page element can be set to be less than or equal to a preset threshold, and the threshold may be determined according to the layout of the web page, the information amount, the size of the display region, etc. and is not limited to a specific value.

Step 102: determining a web page element located in the above-mentioned reference region in the first web page.

In this step, more specifically, the web page element located in the reference region can be determined according to the coordinates of the reference region in the first web page and the coordinates of the web page element in the first web page.

If only one web page element is located in the reference region, the subsequent step is directly executed according to the web page element in the reference region; and if a plurality of web page elements are located in the reference region, any one of the web page elements can be selected at random, or one web page element is selected from the plurality of web page elements according to a certain screening condition, and then the subsequent step is executed according to the selected web page element. With respect to the example of selecting the web page element according to a certain screening condition, please refer to the description on the preferred embodiments for details. If no web page element is located in the reference region, or no web page element that meets the above screening condition is presented, the area of the above reference region may be expanded and then Step 102 is repeated.

In the embodiments of the present invention, the web page element located in the reference region may include a web page element entirely located within the reference region, and may also include a web page element having an overlapping region with the reference region.

Step 103: according to the coordinates of the web page element in the first web page and in the second web page, calculating a moving displacement of the web page element in the second web page.

Wherein, the second web page is a web page displayed in a second display state after the display screen is switched from a first display state to the second display state.

In this step, first the coordinates of the web page element in the first web page are obtained, and after the display screen is switched to the second display state, the coordinates of the web page element in the second web page in the second display state are then obtained, wherein the method for obtaining the coordinates in the second web page through the coordinates of the web page element in the first web page is well known in the art, and thus is not repeated in detail herein. Thereafter, according to the coordinates of the web page element in the first web page and the second web page, or combined with the coordinates of the vertex of the upper left corner of the display region in the first web page, namely the coordinates of the upper left corner of the display screen in the first web page, a moving displacement of the web page element in the second web page is calculated. The specific method for calculating the moving displacement is similar to that known to a person skilled in the art, and thus is not repeated in detail herein.

Step 104: according to the moving displacement of the web page element in the second web page, moving the second web page.

After the moving displacement of the web page element in the second web page is determined, web page elements in the second web page are moved as a whole according to the moving direction and distance indicated by the moving displacement.

Step 105: displaying the second web page after the web page elements are moved.

In the embodiments of the present invention, the reference region is set to surround the web page element for locating the reading region of users so that the range for selecting the web page element is expanded in comparison to using one point for locating, thereby increasing the rationality of the selected web page element, and the web page element is selected to enhance the accuracy of locating the reading region of users, and further to enhance the accuracy of the moving displacement of the web page element when calculating the moving displacement of the web page element according to the position moving of the web page element, and when the screen display state changes, to achieve more accurate display of the web page information prior to the change and to reduce the possibility of the situation occurring in the available technologies that the web page information displayed after the turning of the display screen deviates from the web page information read by users prior to the turning due to the inaccurate locating, thereby improving the reading experience of users.

Figure 2:
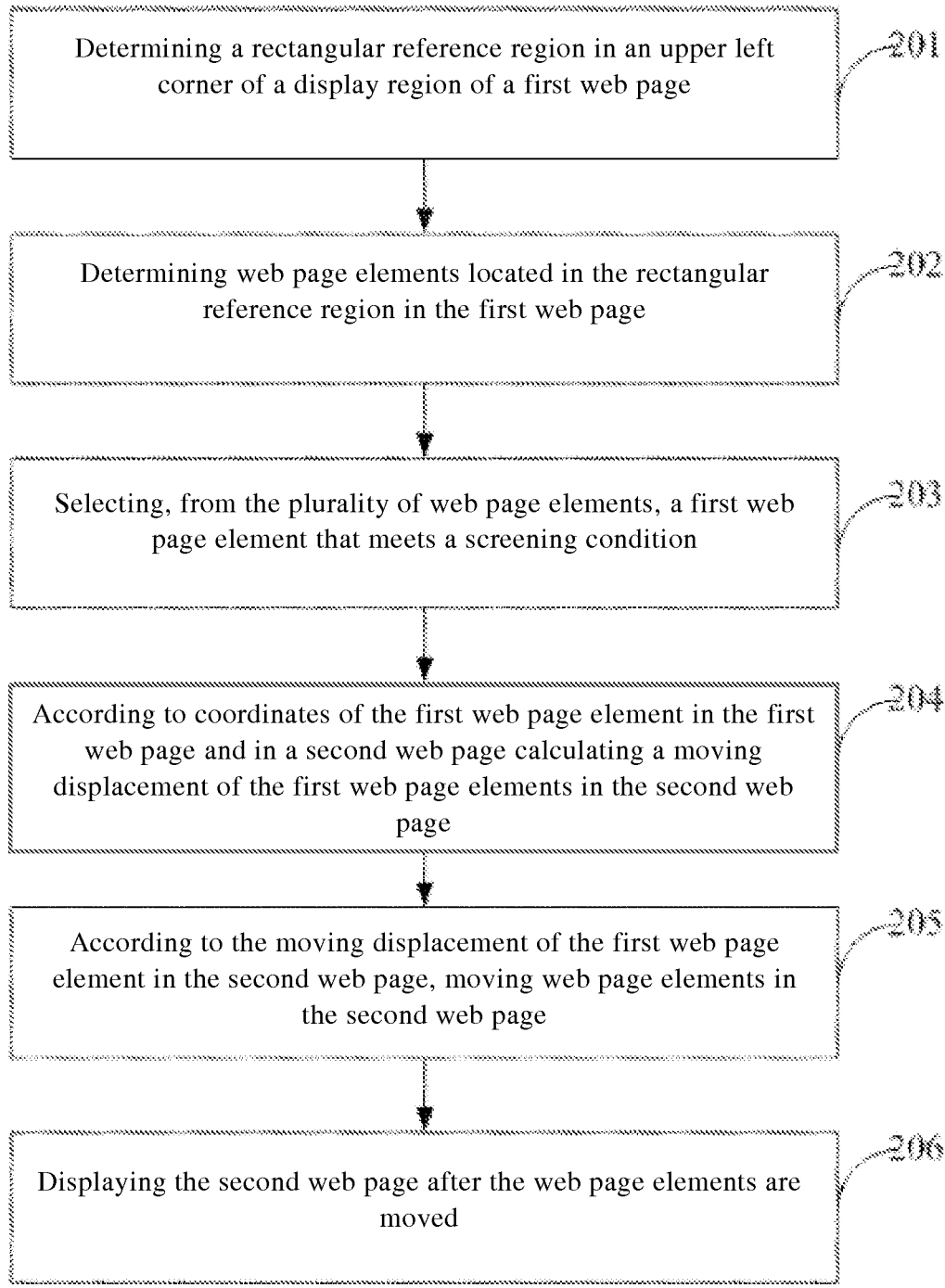
FIG. 2 is a flowchart of the web page display method according to a preferred embodiment of the present invention.

FIG. 2 is a flowchart of the web page display method according to a preferred embodiment of the present invention. The preferred embodiment, for illustrative purpose, takes the reference region being located in the upper left corner of the display region of the first web page and being in a rectangular shape as an example, but is not limited to this.

The method may include:

Step 201: determining a rectangular reference region in an upper left corner of a display region of a first web page.

This step is similar to Step 101 in the preceding embodiment. In this embodiment, the reference region may be a 20*20 rectangular region, the rectangular reference region is located in the upper left corner of the display region of the first web page, namely located in the upper left corner of the display screen of an electronic device.

Step 202: determining web page elements located in the rectangular reference region in the first web page.

In this step, it may be assumed that a plurality of web page elements are located in the rectangular reference region and have an overlapping region with the rectangular reference region.

Step 203: selecting, from the plurality of web page elements, a first web page element that meets a screening condition.

One method for selecting the first web page element may be selecting, from the plurality of web page elements, a web page element having a minimum width and/or a maximum overlapping area with the reference region as the first web page element, wherein, the priority of selecting the web page element having the minimum width is higher than the priority of selecting the web page element having the maximum overlapping area with the reference region.

Another method for selecting the first web page element may be selecting, from the plurality of web page elements, a web page element having at least one corner located in the reference region as the first web page element, wherein, the corner of the web page element may be the upper left corner, the upper right corner, the lower left corner, or the lower right corner of the web page element.

The following defines the condition for the web page element to have at least one corner located in the reference region.

It is assumed that the upper left corner of the screen is defined as (0, 0). A positive x-axis is horizontal on the screen, i.e., the direction from left to right along the screen is an x-axis positive direction; a positive y-axis is vertical on the screen, i.e., the direction from top to down along the screen is a y-axis positive direction.

The condition for the upper left corner of the web page element to fall within the rectangular reference region is: the coordinate x of the upper left corner of the web page element≥the coordinate x of the upper left corner of the screen and the coordinate x of the upper left corner of the web page element≤(the coordinate x of the upper left corner of the screen+the width of the rectangular reference region), and the coordinate y of the upper left corner of the web page element≥the coordinate y of the upper left corner of the screen and the coordinate y of the upper left corner of the web page element≤(the coordinate y of the upper left corner of the screen+the height of the rectangular reference region).

The condition for the upper right corner of the web page element to fall within the rectangular reference region is: (the coordinate x of the upper left corner of the web page element+the width of the web page element)≥the coordinate x of the upper left corner of the screen and (the coordinate x of the upper left corner of the web page element+the width of the web page element)≤(the coordinate x of the upper left corner of the screen+the width of the rectangular reference region), and the coordinate y of the upper left corner of the web page element≥the coordinate y of the upper left corner of the screen and the coordinate y of the upper left corner of the web page element≤(the coordinate y of the upper left corner of the screen+the height of the rectangular reference region).

The condition for the lower left corner of the web page element to fall within the rectangular reference region is: the coordinate x of the upper left corner of the web page element≥the coordinate x of the upper left corner of the screen and the coordinate x of the upper left corner of the web page element≤(the coordinate x of the upper left corner of the screen+the width of the rectangular reference region), and (the coordinate y of the upper left corner of the web page element+the height of the web page element)≥the coordinate y of the upper left corner of the screen and (the coordinate y of the upper left corner of the web page element+the height of the web page element)≤(the coordinate y of the upper left corner of the screen+the height of the rectangular reference region).

The condition for the lower right corner of the web page element to fall within the rectangular reference region is: (the coordinate x of the upper left corner of the web page element+the width of the web page element)≥the coordinate x of the upper left corner of the screen and (the coordinate x of the upper left corner of the web page element+the width of the web page element)≤(the coordinate x of the upper left corner of the screen+the width of the rectangular reference region), and (the coordinate y of the upper left corner of the web page element+the height of the web page element)≥the coordinate y of the upper left corner of the screen and (the coordinate y of the upper left corner of the web page element+the height of the web page element)≤(the coordinate y of the upper left corner of the screen+the height of the rectangular reference region).

Step 204: according to the coordinates of the first web page element in the first web page and in a second web page, calculating a moving displacement of the first web page element in the second web page.

The coordinate system of the first web page is the same as the coordinate system of the second web page, both of which can take the upper left corner of the respective web page as the origin, a horizontally rightward direction as a X-axis positive direction, and a vertically downward direction as a Y-axis direction, and have the same unit coordinate values.

Figure 3A:
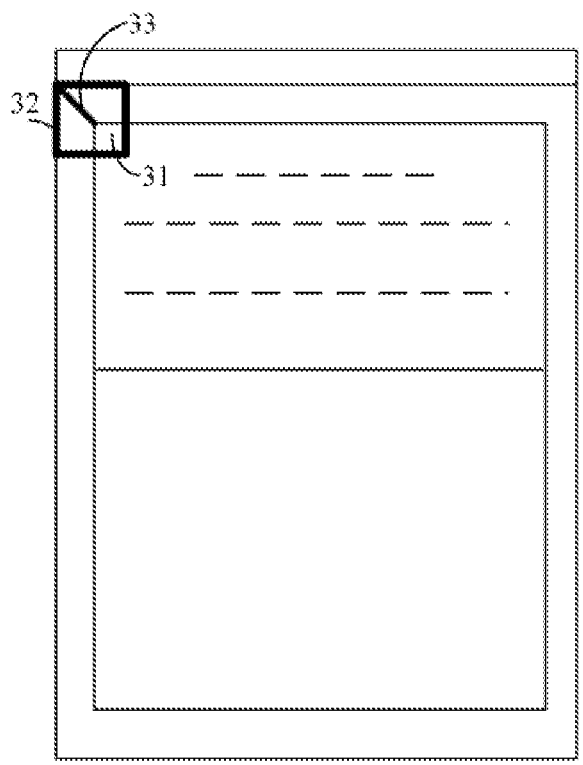
FIG. 3a and FIG. 3b are respectively schematic views of a web page before and after moving according to a preferred embodiment of the present invention.

As shown in FIG. 3a, taking that the upper left corner 31 of the first web page element is located in the rectangular reference region 32 as an example for illustration. After the first web page element is determined, a distance 33 between the first web page element and the upper left corner of the display screen can be first calculated according to the coordinates of the first web page element in the first web page and the coordinates of the upper left corner of the display screen in the first web page, and the distance 33 corresponding to a distance on the X axis is ΔX, and corresponding to a distance on the Y axis is ΔY.

After the display screen is switched from the portrait display state to the landscape display state, for example, the coordinates (X', Y') of the first web page element in the second web page and the coordinates of the upper left corner of the display screen in the second web page are obtained. Then the coordinate point of (X'+ΔX, Y'+ΔY) is taken as the coordinate point of the upper left corner of the display screen in the second web page after being moved, i.e., the displacement between the coordinate point of the upper left corner of the display screen in the second web page and the coordinate point with the coordinates (X'+ΔX, Y'+ΔY) is taken as the moving displacement of the web page element in the second web page.

Step 205: according to the moving displacement of the first web page element in the second web page, moving web page elements in second web page, for example, as a whole.

Step 206: displaying the second web page after the web page elements are moved.

Figure 3B:
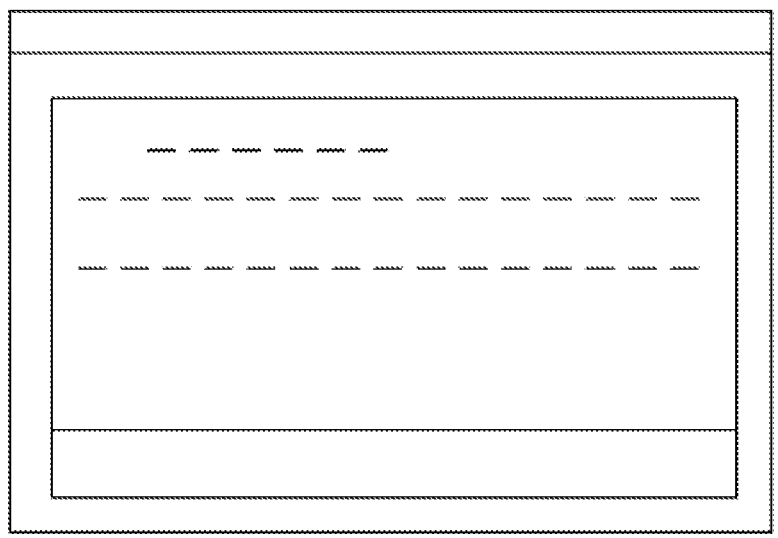

As shown in FIG. 3b, the content displayed in the second web page after the web page elements are moved is in the same position as the content displayed in the first web page, having no deviation.

Steps 205-206 are similar to Steps 104-105 in the aforementioned embodiments, thus being not repeated in detail herein.

In the embodiments of the present invention, the reference region is set to surround the web page element for locating the reading region of users and the web page elements located in the reference region are screened according to the screening condition, thereby increasing the rationality of the selected web page element, and the web page element is selected to enhance the accuracy of locating the reading region of users, and further to enhance the accuracy of the moving displacement of the web page element when calculating the moving displacement of the web page element according to the position moving of the web page element, and when the screen display state changes, to achieve more accurate display of the web page information prior to the change, thereby improving the reading experience of users.

The above is a description of the embodiments of the method according to the present invention, and the following illustrate a device for implementing the above method.

Figure 4:
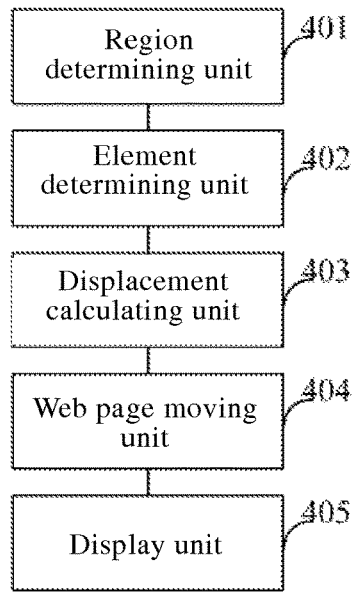
FIG. 4 is a schematic view of the structure of a web page display device according to an exemplary embodiment of the present invention.

FIG. 4 is a schematic view of the structure of a web page display device according to an exemplary embodiment of the present invention.

The device may comprise:

a region determining unit 401, configured to determine a reference region in a display region of a first web page, the first web page being a web page displayed in a first display state of a display screen, wherein the area of the reference region is less than or equal to a preset threshold;

an element determining unit 402, configured to determine a web page element located in the reference region in the first web page;

a displacement calculating unit 403, configured to, according to coordinates of the web page element in the first web page and in a second web page, calculate moving displacement of the web page element in the second web page, wherein the second web page is a web page displayed in a second display state after the display screen is switched to the second display state from the first display state;

a web page moving unit 404, configured to, according to the moving displacement of the web page element in the second web page, move web page elements in the second web page, for example, as a whole; and a display unit 405, configured to display the second web page after the web page elements are moved.

The region determining unit 401 first determines a reference region for selecting the web page element, and then the element determining unit 402 determines the web page element located in the reference region, and after determining the web page element, the displacement calculating unit 403, according to the coordinates of the web page element in the first web page and in the second web page before and after the display state of the display screen is switched, or combined with the coordinates of the upper left corner of the screen in the first web page and the second web page, calculates moving displacement of the web page element in the second web page. Afterwards, the web page moving unit 404 moves the web page elements in the second web page, for example, as a whole, according to the moving displacement. Finally, the display unit 405 displays the second web page after the web page elements are moved.

In the embodiments of the present invention, the web page display device surrounds the web page element for locating the reading region of users by setting the reference region, increases the available web page element or elements for locating, reduces the area of the region occupied by the finally selected web page element, increases the rationality of the selected web page element, enhances the accuracy of locating the reading region of users by selecting the web page element, thereby enhancing the accuracy of the moving displacement of the web page element when calculating the moving displacement of the web page element/according to the position moving of the web page element, when the screen display state changes, achieving more accurate display of the web page information prior to the change, and improving the reading experience of users.

Figure 5:
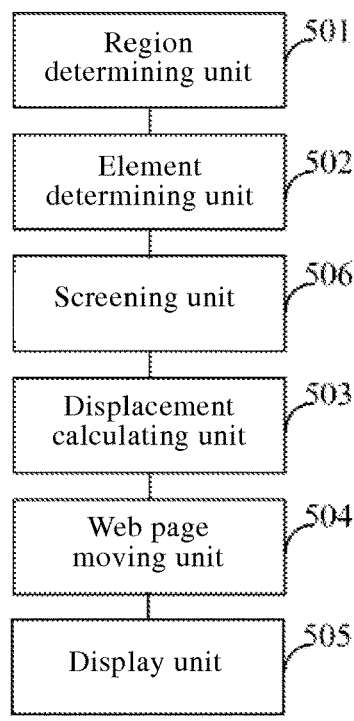
FIG. 5 is a schematic view of the structure of the web page display device according to a preferred embodiment of the present invention.

FIG. 5 is a schematic view of the structure of the web page display device according to a preferred embodiment of the present invention. The preferred embodiment, for illustrative purpose, takes the reference region being located in the upper left corner of the display region of the first web page and being in a rectangular shape as an example, but is not limited to this embodiment.

In addition to a region determining unit 501, an element determining unit 502, a displacement calculating unit 503, a web page moving unit 504, and a display unit 505, the device may further include a screening unit 506.

In the device, the region determining unit 501 is, for example, configured to determine the reference region in an upper left corner of the display region of the first web page. The reference region is in a rectangular shape.

In the device, the element determining unit 502 is, for example, configured to determine web page elements located in the rectangular reference region in the first web page. It is assumed that a plurality of web page elements are located in the rectangular reference region and have an overlapping region with the rectangular reference region.

The screening unit 506 is configured to, when a plurality of web page elements are located in the reference region in the first web page, select a first web page element that meets the screening condition from the plurality of web page elements before the displacement calculating unit 503 calculates the moving displacement of the first web page element in the second web page; in an exemplary embodiment, the screening unit is, for example, configured to select a web page element having a minimum width and/or a maximum overlapping area with the reference region as the first web page element. In another exemplary embodiment, the screening unit is, for example, configured to select, from the plurality of web page elements, a web page element having at least one corner located in the reference region as the first web page element.

The displacement calculating unit 503 is, for example, configured to, according to the coordinates of the first web page element in the first web page and in the second web page, calculate the moving displacement of the first web page element in the second web page.

The web page moving unit 504 and the display unit 505 are similar to the web page moving unit 404 and the display unit 405 in the aforementioned embodiments, thus being not repeated in detail herein.

In the embodiments of the present invention, the web page display device limits the web page elements for locating the reading region of users by setting the reference region and screening the web page elements located in the reference region according to a screening condition, thereby increasing the rationality of the selected web page element, and enhances the accuracy of locating the reading region of users by selecting the web page element, thereby enhancing the accuracy of the moving displacement of the web page element when calculating the moving displacement of the web page element according to the position moving of the web page element, when the screen display state changes, achieving more accurate display of the web page information prior to the change, and improving the reading experience of users.

It may be appreciated by those of ordinary skill in the art that each exemplary unit and algorithm step described in combination with the embodiments disclosed herein may be implemented by electronic hardware or a combination of computer software and electronic hardware. Whether these functions are executed in a hardware mode or a software mode depends on particular applications and design constraint conditions of the technical solution. The professional technicians may use different methods to implement the described functions with respect to each particular application, but such implementation should not be considered to go beyond the scope of the present invention.

It may be clearly understood by a person skilled in the art that, for the purpose of convenient and brief description, reference can be made to a corresponding process in the foregoing exemplary embodiments for a specific working process of the foregoing system, apparatus, and unit, and details are not described herein again.

In the several embodiments provided in the present application, it should be understood that the disclosed system, apparatus, and method may be implemented in other manners. For example, the apparatus embodiment described above is merely exemplary. For example, the unit division is merely logical function division and there may be other division manners in actual implementation. For example, a plurality of units or components may be combined or integrated into another system, or some features may be ignored or not performed. In addition, the displayed or discussed mutual couplings or direct couplings or communication connections may be implemented through indirect couplings or communication connections among some interfaces, apparatuses, and/or units, which may be implemented in electronic, mechanical, or other configurations.

The units described as separate parts may or may not be physically separated, and parts displayed as units may or may not be physical units, may be located in one position, or may be distributed on a plurality of network units. A part or all of the units may be selected according to actual needs to achieve the objectives of the solutions of the embodiments.

In addition, functional units in each of the embodiments of the present invention may be integrated into one processing unit, or each of the units may exist alone physically, or two or more of units may be integrated into one unit.

When the functions are implemented in a form of a software functional unit and sold or used as an independent product, the functions may be stored in a computer-readable storage medium. Based on such an understanding, the technical solutions of the present invention essentially, or the part contributing to the art, or a part of the technical solutions may be implemented in a form of a software product. The software product is stored in a storage medium, which includes several instructions for instructing a computer device (which may be a personal computer, a server, or a network device) or a processor to perform all or some of the steps of the methods described in each of the embodiments of the present invention. The storage medium includes: any medium that can store program code, such as a USB flash disk, a removable hard disk, a read-only memory (ROM, Read-Only Memory), a random access memory (RAM, Random Access Memory), a magnetic disk, or an optical disc.

Apparently, those skilled in the art should understand that, each of the above-mentioned module or step of the present invention may be implemented through a universal computing device, for instance, they can be integrated on a signal computing device, or distributed on a network composed of a plurality of computing devices. Optically, each module or each step may be implemented by using a computing device-executable program codes, thus they can be stored in a storage device and executed by the computing device, and the computing device may be a processor such as a CPU. Preferably, the computing device is configured in, for example, a mobile phone, a PDA, a tablet computer, or other handheld mobile terminals. Moreover, in some cases, the steps shown or described may be executed in a sequence different from the sequence herein. Or they are respectively fabricated into each integrated circuit module, or a plurality of modules or steps among them are fabricated into a single integrated circuit module for implementation. In this way, the present invention is not confined to any specific combination of hardware and software.

Furthermore, it should be understood that the computer-readable storage device (for example, a memory) may be a volatile or non-volatile memory, or may include both of the volatile and non-volatile memories. As an example rather than limiting, the non-volatile memory may include a read-only memory (ROM), a programmable ROM (PROM), an electrical programmable ROM (EPROM), an electrically erasable programmable ROM (EEPROM), or a Flash memory. The volatile memory may include a random access memory (RAM), which can be used as an external cache memory. As an example rather than limiting, the RAM can be obtained in various forms, such as a synchronous RAM (DRAM), a dynamic RAM (DRAM), a synchronous DRAM (SDRAM), a double data rate SDRAM (DDR SDRAM), an enhanced SDRAM (ESDRAM), a synchronous-link DRAM (SLDRAM), and a direct Rambus RAM (DRRAM). The storage device in the disclosed aspects is intended to include, but is not limited to, these and other appropriate types of memories.

Persons skilled in the art would further understand that, various exemplary logic blocks, modules, circuits, and algorithm steps described in combination with the disclosure herein can be implemented as electronic hardware, computer software, or a combination thereof. To clearly illustrate such an interchangeability of hardware and software, a general description has been given on the functions of a variety of illustrative components, blocks, modules, circuits, and steps. Whether the functions are implemented as hardware or software depends on particular applications and design constraints applied to the whole system. Persons skilled in the art may realize the functions in various ways for each specific application, but such a realization should not be interpreted to result in departing from the scope of the present invention.

The various illustrative logic blocks, modules, and circuits described in combination with the disclosure herein can be implemented or executed by using the following members (which are designed for executing the functions herein): a general processor, a digital signal processor (DSP), an application specific IC (ASIC), and a field programmable gate array (FPGA), or other programmable logic devices, discrete gate or transistor logics, discrete hardware components, or any combination of those members. The general processor may be a microprocessor, but alternatively, the processor may be any traditional processor, controller, microcontroller, or state machine. The processor may also be implemented as a combination of computing devices, for example, a combination of a DSP and a microprocessor, multiple microprocessors, one or more of microprocessors in combination with a DSP core, or any other such configurations.

The method or algorithm steps described in combination with the disclosure herein can be directly included in hardware, a software module executed by a processor, or a combination thereof. The software module can reside in a RAM memory, a Flash memory, a ROM memory, an EPROM memory, an EEPROM memory, a register, a hard disk, a removable disk, a CD-ROM, or storage media in any other forms well-known in the art. The illustrative storage media are coupled to a processor so that the processor can read information from the storage media or write information into the storage media. In an alternative embodiment, the storage media can be integrated with the processor. The processor and the storage media can reside in the ASIC. The ASIC can reside in a user terminal. In another alternative embodiment, the processor and the storage media can be used as discrete components and reside in a user terminal.

The above description is merely exemplary embodiments of the present invention, and is not intended to limit the protection scope of the present invention. Any one skilled in the art can easily think of variations or substitutions within the technical scope disclosed by the present invention, all of which shall fall within the protection scope of the present invention. Therefore, the protection scope of the present invention should conform to the protection scope of the claims.

The invention claimed is:

1. A web page display method, comprising:
   determining a reference region in a display region of a first web page, the first web page being a web page displayed in a first display state of a display screen, wherein the area of the reference region is less than or equal to a preset threshold;
   determining a first non-full-screen web page element located in the reference region in the first web page;
   according to coordinates of the first non-full-screen web page element in the first web page and in a second web page with respect to edges of the display screen, calculating a moving displacement of the first non-full-screen web page element in the second web page, wherein the coordinates of the first non-full-screen web page element in the second web page are coordinates of the first non-full-screen web page element displayed in the second web page in a second display state, obtained after the display screen is switched to the second display state from the first display state;
   according to the moving displacement of the first non-full-screen web page element in the second web page, moving web page elements in the second web page; and
   displaying the second web page after the web page elements are moved.

2. The method of claim 1, further comprising:
   determining the reference region in an upper left corner of the display region of the first web page.

3. The method of claim 1, wherein the reference region is in a rectangular shape.

4. The method of claim 1, further comprising:
   when a plurality of web page elements are located in the reference region in the first web page, selecting, from the plurality of web page elements, a non-full-screen web page element that meets a screening condition as the first non-full-screen web page element.

5. The method of claim 4, further comprising:
   selecting, from the plurality of web page elements, a non-full-screen web page element having a minimum width and/or a maximum overlapping area with the reference region as the first non-full-screen web page element.

6. The method of claim 4, further comprising:
   selecting, from the plurality of web page elements, a non-full-screen web page element having at least one corner located in the reference region as the first non-full-screen web page element.

7. A web page display device, comprising:
   a region determining unit, configured to determine a reference region in a display region of a first web page, the first web page being a web page displayed in a first display state of a display screen, wherein the area of the reference region is less than or equal to a preset threshold;
   an element determining unit, configured to determine a first non-full-screen web page element located in the reference region in the first web page;
   a displacement calculating unit, configured to, according to coordinates of the first non-full-screen web page element in the first web page and in a second web page with respect to edges of the display screen, calculate a moving displacement of the first non-full-screen web page element in the second web page, wherein the coordinates of the first non-full-screen web page element in the second web page are coordinates of the first non-full-screen web page element displayed in the second web page in a second display state, obtained after the display screen is switched to the second display state from the first display state;
   a web page moving unit, configured to, according to the moving displacement of the first non-full-screen web page element in the second web page, move web page elements in the second web page; and
   a display unit, configured to display the second web page after the web page elements are moved.

8. The device of claim 7, wherein,
   the region determining unit is configured to determine the reference region in an upper left corner of the display region of the first web page.

9. The device of claim 7, wherein the reference region is in a rectangular shape.

10. The device of claim 7, further comprising:
a screening unit, configured to, when a plurality of web page elements are located in the reference region in the first web page, select, from the plurality of web page elements, a non-full-screen web page element that meets a screening condition as the first non-full-screen web page element.

11. The device of claim 10, wherein,
the screening unit, is configured to select, from the plurality of web page elements, a non-full-screen web page element having a minimum width and/or a maximum overlapping area with the reference region as the first non-full-screen web page element.

12. The device of claim 10, wherein,
the screening unit, is configured to select, from the plurality of web page elements, a non-full-screen web page element having at least one corner located in the reference region as the first non-full-screen web page element.

13. A computer-readable medium having a set of processor-executable program codes, that, when executed by at least one processor, cause at least one processor to perform a method comprising:
determining a reference region in a display region of a first web page, the first web page being a web page displayed in a first display state of a display screen, wherein the area of the reference region is less than or equal to a preset threshold;
determining a first non-full-screen web page element located in the reference region in the first web page;
according to coordinates of the first non-full-screen web page element in the first web page and in a second web page with respect to edges of the display screen, calculating a moving displacement of the first non-full-screen web page element in the second web page, wherein the coordinates of the first non-full-screen web page element in the second web page are coordinates of the first non-full-screen web page element displayed in the second web page in a second display state, obtained after the display screen is switched to the second display state from the first display state;
according to the moving displacement of the first non-full-screen web page element in the second web page, moving web page elements in the second web page; and
displaying the second web page after the web page elements are moved.

14. The method of claim 13, further comprising:
determining the reference region in an upper left corner of the display region of the first web page.

15. The method of claim 13, wherein the reference region is in a rectangular shape.

16. The method of claim 13, further comprising:
when a plurality of web page elements are located in the reference region in the first web page, selecting, from the plurality of web page elements, a non-full-screen web page element that meets a screening condition as the first non-full-screen web page element.

17. The method of claim 16, further comprising selecting, from the plurality of web page elements, a non-full-screen web page element having a minimum width and/or a maximum overlapping area with the reference region as the first non-full-screen web page element.

18. The method of claim 16, further comprising:
selecting, from the plurality of web page elements, a non-full-screen web page element having at least one corner located in the reference region as the first non-full-screen web page element.

* * * * *